Patented Feb. 18, 1941

2,232,470

UNITED STATES PATENT OFFICE 2,232,470

DISPERSED DYESTUFF POWDER

Frederick E. Petke, Bound Brook, N. J., assignor, by mesne assignments, to American Cyanamid Company, New York, N. Y., a corporation of Maine No Drawing. Application September 3, 1938, Serial No. 228,464

4 Claims. (Cl. 8—79)

This invention relates to dispersible dyes capable of dyeing cellulose acetate or of being vatted.

In the past, cellulose acetate colors have been dyed from a soap bath and as these dyes are not themselves soluble in water and usually not sufficiently soluble in a soap solution, it has been necessary to treat them to bring them into a dispersible form. The most common form is that developed some years ago involving treatment of the dye with fatty or oily bodies such as fatty acids, soaps, and the like, or with carbocyclic dispersing agents. A more recent development not involving chemical reaction of the dye with, or solution in, the dispersing agent, which is the case when the fatty acid or soap process is used, is described in the copending application of Crossley, Kienle and Peiker, Serial No. 149,924 filed June 23, 1937, Patent No. 2,181,800. In this case, the individual dye particles are treated to coat them with a hydrophilic protective agent of the type of dextrine.

According to the present invention, dispersible cellulose acetate or vat dyestuffs are prepared by mixing the dye either wet or dry with bentonite, preferably with the addition of casein. The powders obtained by the present invention are not only readily dispersible, in which respect they are fully equal to the dispersible products produced in the past, but they are extremely stable, retaining their fine dispersion even when boiled. This is an important advantage when hot dye baths are employed or where heat is used as in machine dyeing such as vat and jig dyeing.

The present invention is applicable in general to cellulose acetate dyes, most of which are azo dyes, but is not limited strictly to azo colors as it is applicable also to some other coloring matters such as, for example, vat dyes.

The invention will be described in detail in conjunction with the following specific examples. The parts are by weight.

Example 1

650 parts of a cellulose acetate color press cake containing 38.4% color (prepared by coupling diazotized paranitroaniline on alphanaphthylamine and subsequently reducing the nitro group) were placed in a small dough mixer with 50 parts of bentonite for 30 minutes. 3 parts of a deflocculating agent, disodium disulfodinaphthylmethane, were then added and the mixing continued for another 30 minutes. The wet mix was then placed in a copper pan and dried in a vacuum oven at 100° C. under a vacuum of 29".

30 parts of trisodium phosphate monohydrate, 130 parts of commercial casein (80% passes through a 140 mesh screen), and 100 parts of sodium hexametaphosphate were added to 144 parts of the dry pre-treated press cake, prepared as described above. The mixture was ground in a mikro pulverizer which was equipped with a $\frac{1}{32}$" screen and operated at a speed of 7500 R. P. M.

The powder so obtained dispersed very readily in hot water to give a stable dispersion which could be boiled without precipitation of the dyestuff. A suspension so prepared dyed cellulose acetate a yellow-orange shade which, when diazotized on the fiber and coupled with beta oxynaphthoic acid, gave a red shade of black.

Example 2

200 parts of a dyestuff prepared by coupling diazotized para nitraniline on phenyl diethanolamine and reducing the nitro group were ground through three times in a mikro pulverizer with 100 parts of bentonite and 100 parts casein (87% passed through a 100 mesh screen). The mikro pulverizer was equipped with a $\frac{1}{32}$" screen and operated at 7500 R. P. M.

The material so obtained was easily dispersible in hot water and did not precipitate even after boiling for 5 minutes. The dispersion so obtained dyed cellulose acetate a dull orange which, when diazotized and coupled with beta oxynaphthoic acid, gave a greenish black.

Example 3

675 parts of a wet press cake (prepared by coupling 2-methoxy-4-nitraniline on phenylethylethanolamine) were deflocculated with 9 parts of sodium lignin sulfonate and 10 cc. of 15 N ammonia. The press cake deflocculated readily.

40 parts of bentonite dust were stirred into 403 parts of the above slurry, and the wet mix so obtained was dried in a vacuum oven at 55°–60° C. under a vacuum of approximately 29.5".

135 parts of the dried mix prepared as described above were ground in a mikro pulverizer with 10 parts of trisodium phosphate, 70 parts of casein and 55 parts of sodium hexametaphosphate. The powder so prepared dispersed readily in hot water and gave a suspension which did not flocculate or precipitate even on boiling. The dispersed material dyed cellulose acetate red.

Example 4

300 parts of a yellow dyestuff prepared by heating 2,4-dinitrochlorbenzene with p-aminophenol was mikromilled with 900 parts of water and the resulting suspension ballmilled overnight.

600 parts of the slurry obtained above were mixed by means of a small hand stirrer with 45 parts of bentonite and the wet mix was air-dried at 55°–60° C.

130 parts of the dried pre-treated color as prepared above were mikromilled with 100 parts of casein, 78 parts of sodium hexametaphosphate and 25 parts of trisodium phosphate monohydrate. The powder so obtained dispersed readily to give a dispersion in water which was stable even to boiling. The dispersion dyed cellulose acetate a red-yellow.

Example 5

500 parts of a wet press cake of 4,4'-dimethyl-6,6'-dichlor-2,2' - bis - thionaphthenindigo which contained 160 parts actual color were placed in a beaker. This press cake was deflocculated with 1.6 parts of disodium disulfodinaphthylmethane and 30 parts of bentonite dust were stirred in. The stiff paste thus obtained was air-dried at 60° C.

119 parts of dried, treated pink press cake prepared as described above were dry ground in a mikro pulverizer with 140 parts of casein, 110 parts of sodium hexametaphosphate and 30 parts of trisodium phosphate. The powder so obtained dispersed readily.

What I claim is:

1. A dispersible dyestuff powder comprising an intimate mixture of the dyestuff, bentonite and casein, the product being capable of ready dispersion in a dyeing bath and remaining dispersed at temperatures up to the boiling point of water.

2. A dispersible azo dyestuff powder capable of dyeing cellulose acetate comprising an intimate mixture of the azo dyestuff, bentonite and casein, the product being capable of ready dispersion in cellulose acetate dyeing bath and remaining dispersed at temperatures up to the boiling point of water.

3. A dispersible vat dyestuff powder comprising an intimate mixture of the vat dyestuff, bentonite and casein, the product being capable of ready dispersion in a dyeing bath and remaining dispersed at temperatures up to the boiling point of water.

4. A method of preparing a dispersible dyestuff which comprises intimately mixing a press cake of the coloring matter with a mixture of bentonite and casein and drying and grinding to a powder.

FREDERICK E. PETKE.